3,479,327
POLYMERS OF VINYL ESTERS AND N-VINYL-3-ALKYL-LACTAMS
Ashot Merijan, Clark, and Frederick Grosser, Midland Park, N.J., assignors to GAF Corporation, New York, N.Y., a corporation of Delaware
No Drawing. Filed Nov. 19, 1965, Ser. No. 508,828
Int. Cl. C08f *19/00, 7/14;* A61k *7/14*
U.S. Cl. 260—85.7        6 Claims

ABSTRACT OF THE DISCLOSURE

Polymers of vinyl esters and N-vinyl-3-alkyl-lactams are provided in which the said lactams have the formula:

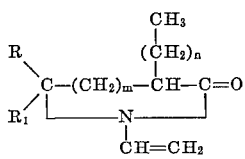

wherein R and $R_1$ are either hydrogen, methyl or ethyl, $m$ is an integer of from 1 to 3 and $n$ is an integer of from 5 to 41.

---

This invention relates to a new, novel and useful class of monomers and polymers of N-vinyl lactams containing an alkyl group of from 6 to 42 carbon atoms in α-position to the carbonyl of the lactam ring.

It is known that polymers of N-vinyl lactams in which the regularly recurring lactam rings are substituted by one or more lower alkyl groups can be prepared by conventional polymerization procedures of lower alkyl substtuted N-vinyl lactams. Monomers of the latter type, such as N-vinyl-3-butyl pyrrolidone, N-vinyl-5-methyl-5-ethyl pyrrolidone, N-vinyl-3,3,5-trimethyl pyrrolidone, N-vinyl-6-butyl piperidone, N-vinyl-7-ethyl-caprolactam, N-vinyl-3,5-dimethyl caprolactam, N-vinyl-4-isopropyl caprolactam, N-vinyl-3,5,7-trimethyl caprolactam, etc., when homopolymerized, yield water soluble polymers with additional solubility in lower alcohols, nitroethane, butylamine, etc., but insoluble in hexane, kerosene, mineral oils and other aliphatic and aromatic hydrocarbons. In view of these solubility characteristics, such polymers have limited applications. For example, such polymers cannot be used in applications where waterproofness is a prime requisite. They cannot be used as thickeners in mineral oils or as gloss improvers of waxes and polishes. They are incompatible with waxes and polyalkylene plastics such as polyethylene, polypropylene, etc. They cannot be employed as emollients in cosmetics and soaps.

It is the principal object of the present invention to provide a new and useful class of polymerizable monomers and polymers of N-vinyl lactams containing an alkyl group of from 6 to 42 carbon atoms in α-position to the carbonyl of the lactam ring.

Another object is to provide a new and useful class of polymers (homo- and co-polymers) which are soluble in a variety of aliphatic and aromatic hydrocarbons, higher alcohols and in a certain class of polar solvents.

A still further object is to provide an improved specific process of vinylating 3-alkyl lactams.

Other objects and advantages will become manifest from the following description.

We have found that the foregoing objects are attained by first vinylating a 5-, 6- or 7-membered lactam containing an alkyl group of from 6 to 42 carbon atoms in α-position to the carbonyl of the lactam unit and then homopolymerizing the resulting monomer or co-polymerizing it with other polymerizable monomers. To obtain such monomers, an α-olefin of from 6 to 42 carbon atoms is added by the free radical addition to a 5-, 6- or 7-membered lactone in the presence of a tertiary-alkyl organic peroxide as catalyst, at a temperature of from 100° C. to 160° C., for a period of time ranging from 8 to 24 hours. In conducting the addition reaction (hereinafter referred to as alkylation), it is preferred that the molar ratio of the lactone to the α-olefin and the tertiary-alkyl organic peroxide be in the range of 10–20:1:0.1–0.25. In other words, 10–20 moles of lactone are reacted with one mole of α-olefin in the presence of 0.1–0.25 mole of tertiary-alkyl organic peroxide. If desired, the 5-, 6- or 7-membered lactone may be in solution of an unreactive organic solvent common to the lactone and the α-olefin. Regardless whether the alkylation reaction is carried out in the presence or absence of an unreactive organic solvent, the reaction product is subjected to vacuum stripping to remove excess lactone, peroxide decomposition product and unreactive organic solvent if such was used. The product, alkylated lactone, ranges from a viscous oil to a relatively hard, waxy material. The transition from a viscous oil to a waxy material depends upon the chain length of the α-olefin employed as the alkylating agent. With α-olefins of from 6 to 10 carbon atoms, viscous (oily) alkylated lactones are obtained at room temperature. With α-olefins of from 10 to 20 carbon atoms, waxy crystalline alkylated lactones are obtained at room temperature. With α-olefins of from 22 to 42 carbon atoms, relatively hard, waxy alkylated lactones are obtained at room temperature. The alkylated lactones are then converted to their corresponding lactams by heating one mole of the alkylated lactone with 1.2–1.25 moles of anhydrous ammonia in a pressure vessel, at a temperature of from 250°–300° C., preferably 275° C., and a pressure of from 100 to 1300 p.s.i.g., for a period of time ranging from 15 to 20 hours, as will be pointed out in more detail hereinafter.

In the alkylation of the lactones, any α-olefin (straight-chain or branched) having a molecular weight from about 84 to about 588 may be employed in the alkylation reaction. In other words, α-olefins (straight-chain or branched), ranging from 1-hexene, 1-heptene, 1-octene, 1-nonene, 1-decene, 1-dodecene, 1-tetradecene, 1-hexadecene, 1-heptadecene, 1-octadecene, 1-nonadecene, 1-eicosene, 1-docosene, 1-tetracosene, 1-pentacosene to trimerized α-tetradecene may be used.

While linear α-olefins are preferred because of their commercial availability, numerous isomers of α-olefins ranging from 1-pentene to 1-pentacosene as well as polybutenes may also be employed in the alkylation reaction. The only precaution required in such case is that the isomer contain an ethylenic unsaturation in the α-position thereof.

A mixture of commercially available linear α-olefins produced by cracking petroleum wax or by polymerizing lower olefins may also be used as the alkylating agent. Alpha-olefins in the carbon range of from $C_6$–$C_7$; $C_7$–$C_9$; $C_9$–$C_{11}$; $C_{11}$–$C_{15}$; and $C_{15}$–$C_{20}$ are commercially available and contain from 81 to 87 weight percent of straight-chain α-olefins; from <0.5 to 2 weight percent of straight-chain internal olefins; from 13 to 3 weight percent of branched and naphthenic olefins; from 2 to 4 weight percent of paraffins and naphthenes and from 1 to <1 of aromatics, respectively.

Instead of employing any one of the foregoing α-olefins or mixtures thereof, monohalo-α-olefins and polyhalo-α-olefins of at least 2 carbon atoms may also be employed in the reaction with the 5-, 6- and 7-membered lactones, to yield 3-haloalkyl lactones and 3-polyhaloalkyl lactones which upon conversion to the corresponding lactams followed by vinylation and polymerization will give rise to an entirely new class of polymers in which the haloalkyl or polyhalo-alkyl group of at least 2 carbon atoms is always in α-position to the carbonyl of the lactam moiety in said polymer. In this connection, any monohalo- or polyhalo-α-olefin of at least 2 carbon atoms may be employed, the only restriction being that such olefin contain an ethylenic unsaturation in α-position and that the number of carbon atoms therein be at least 2 to as many carbon atoms as are available or can be made available in such olefins by synthesis. In other words, the length of the carbon chain in such monohalo- and polyhalo-α-olefins is immaterial since they will all react with the lactones under the foregoing reaction conditions.

As examples of such monohalo- and polyhalo-α-olefins, the following are illustrative:

dichlorovinylidene fluoride ($CCl_2=CF_2$)
chlorovinylidene fluoride ($CHCl=CF_2$)
chlorotrifluoroethylene ($CClF=CF_2$)
tetrofluoroethylene ($CF_2=CF_2$)
tetrachloroethylene ($CCl_2=CCl_2$)
vinylidene fluoride ($CH_2=CF_2$)
vinylidene bromide ($CH_2=CBr_2$)
vinylidene chloride ($CH_2=CCl_2$)
vinylidene chlorofluoride ($CH_2=CClF$)
1,2-dichloro-1,2-difluoroethylene ($CClF=CClF$)
1,2-difluoroethylene ($CHF=CHF$)
1-chloro-2-fluoroethylene ($CHF=CHCl$)
1-dichloro-2-fluoroethylene ($CHF=CCl_2$)
trichloroethylene ($CHCl=CCl_2$)
trifluoroethylene ($CF_2=CHF$)
1-dichloro-2-difluoroethylene ($CH_2=CCl_2$)
chlorotrifluoroethylene ($CF_2=CClF$)
1-chloro-2-difluoroethylene ($CF_2=CHCl$)
1-dichloro-2-difluoroethylene ($CF_2=CCl_2$)
chlorotrifluoroethylene ($CF_2=CClF$)
fluorotrichloroethylene ($CCl_2=CClF$)
vinyl chloride ($CH_2=CHCl$)
vinyl fluoride ($CH_2=CHF$)
allyl chloride ($CH_2=CH-CH_2Cl$)
4-chloro-1-butene ($CH_2=CH-CH_2-CH_2Cl$)
3,3,4,4,4-pentafluoro-1-butene ($CH_2=CH-CF_2-CF_3$)
5-chloro-1-pentene ($CH_2=CH-CH_2CH_2CH_2Cl$)
3,3,4,4,5,5,5-heptafluoro-1-pentene
 ($CH_2=CH-CF_2-CF_2-CF_3$)
3,3,4,4,5,5,6,6,6-nonafluoro-1-hexene
 ($CH_2=CH-CF_2-CF_2-CF_2-CF_3$)

As noted above, an unreactive organic solvent may be employed in the alkylation reaction which is common to the lactone and α-olefin(s). As solvents, various alcohols such as methanol, ethanol, propanol, isopropanol, butanol, sec-butanol, amyl alcohol, hexanol, 2-ethyl-1-hexanol, ethylene glycol, 1,2-butanediol, 4-butanediol, etc. may be employed. Other solvents such as diethylene glycol, ethylene glycol monomethyl ether and the like may also be employed. It is to be noted that the nature or character of the organic solvent is immaterial so long as it forms a solution with the lactone and alkylating α-olefin(s), and is not susceptible to alkylation.

The amount of organic solvent employed is not critical. Any amount which will yield a solution of the lactone and α-olefin(s) will suffice.

As peroxide catalyst (initiator) for the alkylation reaction, any one of the known tertiary-alkyl organic peroxides such as, for example, t-butyl hydro-peroxide, di-t-butyl peroxide, t-butyl perbenzoate, di-ti-butyl perphthalate, t-butyl-pentamethyl-ethyl peroxide, t-butyl-triphenyl-methyl peroxide, di-t-amyl peroxide, bis-(triethylmethyl) peroxide, bis-(triphenylmethyl) peroxide, 2,5-dimethyl-hexyl-2,5-dihydro-peroxide, 2,5-dimethyl - 2,5 - di(tibutyl peroxy) hexane, 2,5-dimethylhexyl-2,5-di(peroxy benzoate), and the like may be used.

The 5-, 6- and 7-membered lactones that are alkylated in accordance with the foregoing procedure are characterized by the following formula:

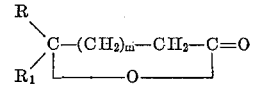

wherein R and $R_1$ are selected from the group consisting of hydrogen, methyl and ethyl, and $m$ is an integer of from 1 to 3. As examples of such lactones, the following are illustrative:

γ-butyrolactone
5-methyl-γ-butyrolactone
5-ethyl-γ-butyrolactone
5,5-dimethyl-γ-butyrolactone
5,5-diethyl-γ-butyrolactone
5-methyl-5-ethyl-γ-butyrolactone
valerolactone
6-methyl-valerolactone
6-ethyl-valerolactone
6,6-dimethyl-valerolactone
6,6-diethyl-valerolactone
6-methyl-6-ethyl-valerolactone
caprolactone
7-methyl caprolactone
7,7-dimethyl caprolactone
7-ethyl caprolactone
7,7-diethyl caprolactone
7-methyl-7-ethyl caprolactone By the use of the 10–20:1:0.1–0.25 molar ratio of lactone, α-olefin and tertiary-alkyl organic peroxide, respectively, under the specified temperature and time range, alkylated lactones are obtained in which the alkyl group of from 6 to 42 carbon atoms is always in α-position to the carbonyl of the lactone unit as demonstrated by elemental analysis, infra-red, and NMR (nuclear magnetic resonance). Alkylation of the corresponding 5-, 6- and 7-membered lactams under the same conditions and with the same molar ratios gives rise to the formation of a mixture of isomeric 1:1 adducts. With 2-pyrrolidone, for example, the isomeric mixture consists of 3-alkyl-pyrrolidone, 5-alkyl-pyrrolidone, N-alkyl-pyrrolidone.

The separation by fractional distillation or recrystallization of the N-alkyl lactams from the mixture of the isomeric 1:1 adduct, prior to vinylation, is not only costly but time consuming. By alkylating the lactones first, followed by ammoniation and vinylation, the formation of the mixture of isomeric products, particularly the N-alkyl lactams, is inhibited. Moreover, by the latter procedure, N-vinyl-3-alkyl lactams are obtained in good yields—about 60–65% conversion—which upon homopolymerization yield polymers ranging from waxy to hard rubbery solids soluble in a variety of hydrocarbons, mineral oils, fats, waxes, etc., and of a K value of from 10 to 100.

The following examples will show how the lactones are alkylated, converted to their corresponding lactams, vinylated, and the resulting monomers polymerized.

EXAMPLE 1

Into a 12-liter, four-necked flask equipped with stirrer, thermometer and reflux condenser, there were charged 7750 grams (90 moles) of butyrolactone, 672 grams (6 moles) of octene-1, and 135 grams (0.9 mole) of di-t-butyl peroxide. The mixture, which consisted of two liquid phases, was heated to reflux, at which time the mixture became a single phase. The mixture was refluxed for nine hours at an average pot temperature range of 120° to 139° C. The reaction mixture was then cooled to room temperature and analyzed for unreacted octene-1. There was found 0.2% of unreacted octene-1, equivalent to 17.1 grams.

The unreacted octene-1 and the excess of butyrolactone were stripped at aspirator vacuum, 20–30 millimeters of mercury. The resulting product was subjected to high vacuum distillation. The 3-octyl butyrolactone was collected at 114°–124° C. and a pressure ranging between 0.1 and 0.5 millimeter of mercury, weighing 478 grams which amounted to a yield of 40%. The residue weighed 520 grams in which the mole ratio of octene-1 vs. butyrolactone was calculated as 2.19. A molecular weight determination of the 3-octyl butyrolactone was made and found to be 197 (calculated 198.3). NMR spectra showed the octyl group in 3-position.

On elemental analysis the 3-octyl butyrolactone showed the following results:

Calculated: C, 72.67%; H, 11.18%. Found: C, 72.35%; H, 11.20%.

EXAMPLE 1a

Example 1 was repeated with the exception that 7750 grams (90 moles) of butyrolactone were placed by 10,320 grams (120 moles). The product weighed 810 grams corresponding to a 68.2% yield based on the octene-1 used. The elemental analysis and NMR spectra were the same as in Example 1.

EXAMPLE 2

Into a stainless steel autoclave there were charged 7750 grams (90 moles) of butyrolactone, 504 grams (6 moles) of hexene-1 and 135 grams (0.9 mole) of di-t-butyl peroxide. The mixture was heated and maintained at 130°–140° C. for 18 hours. The contents of the autoclave were discharged into a reaction flask and the unreacted and excess reactants removed by vacuum stripping and the remainder subjected to vacuum distillation. The product, 3-hexyl butyrolactone, which was collected at 86°–92° C. and at a pressure of 1 mm. of mercury, weighed 506 grams corresponding to a yield of 49.6% based on hexene-1 used. The molecular weight was found to be 165 compared to calculated of 170. The position of the substitution was established by NMR and found to be in the 3-position.

EXAMPLE 3

Into a 2-liter, four-necked flask equipped with stirrer, thermometer and reflux condenser, there were charged 1000 grams (10 moles) of delta valerolactone, 112 grams (0.66 mole) of alpha-dodecene and 19.5 grams (0.13 mole) of di-t-butyl peroxide. The contents of the flask were heated and maintained at 130°–145° C. for 24 hours. The unreacted and excess reactants were stripped in vacuum and the remainder subjected to high vacuum distillation. The product, 3-dodecyl valerolactone, which was collected at 150°–160° C. at a pressure of from 0.1–0.5 mm. of mercury, weighed 73 grams and corresponded to a yield of 41% based on the alpha-dodecene used. The molecular weight was found to be 276 as compared to calculated of 268. The position of the substitution was established by NMR and found to be in the 3-position.

EXAMPLE 4

Into a 3-liter, four-necked flask equipped with stirrer, thermometer and reflux condenser there were charged 1710 grams (15 moles) of caprolactone, 140 grams (one mole) of alpha-decene and 30 grams (0.2 mole) of di-t-butyl peroxide. The contents of the flask were heated and maintained at 130°–145° C. for 22 hours. The unreacted and excess reactants were removed by vacuum stripping and the remainder subjected to high vacuum distillation. The product, 3-decyl caprolactone, which was collected at 155°–164° C. and 0.1 mm. of mercury pressure, weighed 84 grams corresponding to a yield of 33% based on alpha-decene used. The molecular weight was found to be 252 compared to calculated of 254. The position of the substitution was established by NMR and found to be in the 3-position.

EXAMPLE 5

Into a 5-liter, four-necked flask equipped with stirrer, thermometer and reflux condenser there were charged 2580 grams (30 moles) of butyrolactone, 448 grams (2 moles) of alpha-hexadecene and 45 grams (0.3 mole) of di-t-butyl peroxide. The contents of the flask were heated and maintained at 130°–140° C. for 24 hours. The unreacted and excess reactants were stripped in vacuum and the remainder subjected to vacuum distillation. The product, 3-hexadecyl butyrolactone, which was collected at 180°–190° C. and a pressure of 0.01 mm. of mercury, weighed 172 grams corresponding to a yield of 27.8% based on alpha-hexadecene used. The molecular weight was found to be 301 compared to calculated of 310. The position of the substitution was established by NMR and found to be in the 3-position.

EXAMPLE 6

The glass liner of the shaker bomb was charged with 476 grams (2.4 moles) of 3-octyl butyrolactone of Example 1, followed by the addition of 9 grams (0.5 mole) of water. The bomb was placed in its holder and 49 grams (2.88 moles) of ammonia was pressed in from a cylinder. The temperature was raised to 275° C. in the course of three hours. The internal pressure went from 100 p.s.i.g. at 18° C. to 1250 p.s.i.g. at 275° C. The heating was continued for 12 hours at 275° C., the pressure falling to 245 p.s.i.g. at the end of the period.

The initial total charge weighed 534 grams. The weight in the liner at the end of the run was 509 grams. The contents were solid for the most part except for a yellow oily section at the bottom of the liner. The crude product from the liner was transferred to a 2-liter beaker with the aid of 750 grams of acetone. The mixture was heated on a steam bath to 60° C. at which point practically all the material dissolved. The solution was allowed to cool to room temperature and the crystalline solid broken and crushed by means of a spatula. The resulting solid was filtered in a Buchnar funnel and washed several times with cold acetone and noted as Crop A. The mother liquors were concentrated to a weight of 400 grams, cooled and filtered. The solid was washed with cold acetone and noted as Crop B. The mother liquor was concentrated to 142 grams and yielded some additional solid which was noted as Crop C. The remaining liquor was concentrated to 75° C. and 20 millimeters of mercury pressure to give 120 grams of a black liquid which became semi-solid on standing. The first three crops of crystalline solid, i.e., A, B, and C, were dried in a vacuum dessicator at 2 millimeters of mercury pressure and at a temperature of 35–40° C. Melting points were taken with the following results:

|       | Grams | Melting, Point, ° C. |
|-------|-------|----------------------|
| Crop: |       |                      |
| A     | 211.3 | 83–85                |
| B     | 105.3 | 78–81                |
| C     | 7.5   | 77–79                |

The total weight of 3-octyl pyrrolidone was 324.1 grams (Crops A, B, and C) for a total of 1.64 moles or a yield of 69%.

A sample of dried Crop A was submitted for elemental analysis and for infra-red examination with the following results:

Calculated: C, 73.10%; H, 11.65%; N, 7.11%. Found: C, 73.10%; H, 11.70%; N, 7.22%, 7.21%.

Based upon the elemental analysis for $C_{12}H_{23}NO$, the molecular weight was 197.

Infra-red examination of dried Crop A showed no evidence for —$CONH_2$; strong band at 1690 cm.$^{-1}$ in proper range for lactam structure and a bonded NH at 3200 cm.$^{-1}$.

EXAMPLE 7

The procedure of Example 6 was repeated with the exception that 3-octyl-gamma-butyrolactone was replaced by 408 grams (2.4 moles) of 3-hexyl butyrolactone.

EXAMPLE 8

Example 6 was repeated again with the exception that the 3-octyl-gamma-butyrolactone was replaced by 643 grams (2.4 mole) of 3-dodecyl valerolactone.

EXAMPLE 9

Example 6 was again repeated with the exception that 3-octyl-gamma-butyrolactone was replaced by 610 grams (2.4 mole) of 3-decyl caprolactone.

EXAMPLE 10

Example 6 was again repeated with the exception that 3-octyl-gamma-butyrolactone was replaced by 744 grams (2.4 moles) of 3-hexadecyl butyrolactone.

The recrystallized lactams (mixture of Crops A to C) of Examples 7 to 10 are converted to N-vinyl-3-alkyl lactams to yield a new and useful class of monomers which may be homopolymerized or copolymerized with other polymerizable monomers by conventional methods. The vinylation of the 3-alkyl lactams is accomplished by first forming the potassium salt of the lactam by reacting 0.04 mole of potassium tert-butoxide with 1 mole of the lactam in a stainless steel autoclave in the presence of a liquid aromatic hydrocarbon such as, benzene, toluene, xylene, etc., as an inert solvent-diluent. After purging the autoclave three times with nitrogen to a pressure of 100 p.s.i.g., the autoclave is then heated to a temperature of 145°–155° C. and pressured with nitrogen to 70 p.s.i.g. At this point, acetylene is admitted to the autoclave to an internal pressure of 200 p.s.i.g. The uptake in acetylene is determined from the weight loss of acetylene cylinders which have been placed on a balance. After six hours at a temperature ranging between 145–155° C., preferably at 150° C., the temperature is increased to 160° C. and the vinylation continued until the equivalent molar amount, based on the 3-alkyl lactam, of acetylene has been absorbed. The autoclave is allowed to cool to room temperature and the contents removed with the aid of toluene. The solution may contain some solid material. The solution is cooled to 10° C., filtered, and the solid vinylated product washed with the inert solvent-diluent and dried in a vacuum dessicator. The filtrate is concentrated in a rotating evaporator to 75° C. at about 25 mm. and the remainder of the N-vinyl-3-alkyl lactam isolated by fractional distillation at reduced pressure or by recrystallization.

The foregoing temperatures and pressures must be strictly adhered to, otherwise very poor yields of the vinylated product are obtained.

The following examples will show how the 3-alkyl lactams are vinylated.

EXAMPLE 11

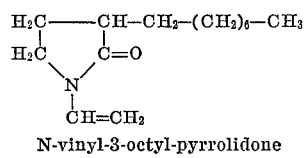

N-vinyl-3-octyl-pyrrolidone

Into a one-liter stainless steel autoclave was charged with 320 grams (1.6 moles) of 3-octyl pyrrolidone, i.e., the mixture of crops A, B and C of Example 6, to which was added 200 grams of C.P. toluene and 7.2 grams (0.064 mole) of a potassium tertiary butoxide. The bomb was purged three times with nitrogen at 100 p.s.i.g. and then heated to 150° C. and pressured with nitrogen to 70 p.s.i.g. and then acetylene admitted to give an internal pressure of 200 p.s.i.g. The uptake in acetylene was taken from the weight loss of the cylinders placed on a balance.

After 6 hours at 150° C., the weight of acetylene absorbed was 13 grams. The temperature after 9 hours was raised to 160° C. and the following absorption of acetylene in grams noted:

| | Temperature | | | | | | | | | |
|---|---|---|---|---|---|---|---|---|---|---|
| | 150° C. | | | | | 160° C. | | | | |
| Tot. C₂H₂ | 10 | 13 | 19 | 24 | 27 | 29 | 31 | 24 | 36 | 37 | 38 |
| Tot. Hrs | 3 | 6 | 10 | 14 | 18 | 22 | 26 | 30 | 34 | 38 | 42 |

The autoclave was cooled and the contents removed with the aid of some toluene. The solution was dark brown and contained some solid. It was cooled to 10° C. and filtered on a coarse sintered glass funnel. The gray solid was washed with a small amount of toluene and dried in a vacuum dessicator to yield 67 grams of product with a melting point of 79.5–81.5° C., which represented recovered 3-octyl pyrrolidone. Recrystallization of a small portion of the recovered 3-octyl pyrrolidone in acetone gave a melting point of 82–83° C.

The toluene mother liquors were concentrated in a rotating evaporator to 75° C. at a pressure of 25 millimeters of mercury to yield a dark brown liquid, weighing 293 grams, which was placed in a 500 mm. distillation flask and distilled through an 18 cm. Vigreux column at 0.7 mm. There were obtained five fractions ($a$ to $e$) with boiling points of from 130° to 135° C. and a refractive index at 25° C. of from 1.4829 to 1.4833. The last fraction ($f$), which was a semi-solid, with a boiling point of 152° C. at 0.7 mm. consisted of unreacted 3-octyl pyrrolidone and vinyl compound. The trap liquid weighed 14 grams and the residue weighed 31 grams. The first five fractions, i.e., ($a$) to ($e$), totaled 229.8 grams or 1.02 moles of N-vinyl-3-octyl-butyrolactone or a 63% conversion.

Elemental anlysis of fraction $c$ (B.P. 135°–133° C.) and $N_D^{25}$ of 1.4833 gave the following results:

Calculated: C, 75.38%; H, 11.21%; N, 6.28%. Found: C, 75.96%, H, 11.55%; N, 6.89%.

EXAMPLE 12

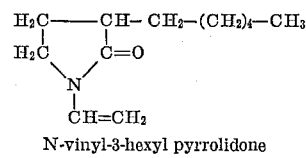

N-vinyl-3-hexyl pyrrolidone

Example 11 was repeated with the exception that the 3-octyl pyrrolidone was replaced by 270 grams (1.6 moles) of 3-hexyl pyrrolidone.

EXAMPLE 13

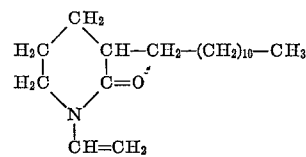

N-vinyl-3-dodecyl piperidone

Example 11 was repeated with the exception that the 3-octyl pyrrolidone was replaced by 427 grams (1.6 moles) of 3-dodecyl piperidone.

EXAMPLE 14

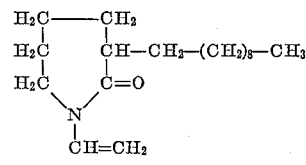

N-vinyl-3-decyl caprolactam

Example 11 was repeated with the exception that the 3-octyl pyrrolidone was replaced by 405 grams (1.6 mole) of 3-decyl caprolactam.

EXAMPLE 15

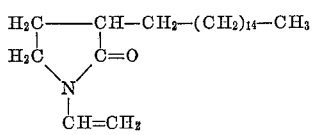

N-vinyl-3-hexadecyl pyrrolidone

Example 11 was repeated with the exception that the 3-octyl pyrrolidone was replaced by 495 grams (1.6 mole) of 3-hexadecyl pyrrolidone.

With acid amides the N-vinyl-3-alkyl lactams as above prepared yield alpha-amidoethyl-3-alkyl lactams. With phenols they yield N-(hydroxyphenyl) - ethyl-3 - alkyl lactams. The latter compounds display excellent capability and softening effect with polyamides. They can also be employed as dye intermediates, textile assistants, and as plasticizers.

The N-vinyl-3-alkyl lactams are also versatile monomers since they are readily homo-polymerized and co-polymerized with many other monomers in virtually any proportions and under a wide variety of conditions to yield polymers with unusual properties. The polymerization (either homo- or co-polymerization) may be conducted in bulk with azobisisobutyronitrile or a mixture of the latter with 35% hydrogen peroxide as catalyst, in solution of hexane, methylisobutylcarbinol, alcohols, and aliphatic and aromatic hydrocarbons, with azo or other radical catalysts including peroxides. The homopolymers derived from such monomers have average molecular weights ranging from about 10,000 to 400,000, depending upon the degree of polymerization, as determined by K values. The molecular weights of the alkylated polymers can be determined by the osmometric method of Frank, H. P. and Levy, G. B., Journ. Polymer Science 10, 371 (1953) and Stoner, G. C. and Azorlosa, J. L., A.C.S. Meeting, Div. Polymer Chem., Dallas, Texas (April 1956).

The homopolymers are insoluble in water, but soluble in hydrocarbons such as hexane, decane, kerosene, mineral oils, "Freons," polyalkylene glycols, fatty acids, fatty acid esters, paraffin wax, natural and synthetic waxes, lanolin and other unctuous materials.

The N-vinyl-3-alkyl lactams readily copolymerize by conventional procedures, preferably in solution of anhydrous ethanol, hexane, methylisobutylcarbinol, and the like with any one of the following monomers:

N-vinyl succinimide,
N-vinyl diglycolyimide,
N-vinyl glutarimide,
N-vinyl-3-morpholinone,
N-vinyl-5-methyl-3-morpholinone,
N-vinyl-5-ethyl-3-morpholinone,
N-vinyl imidazole,
N-vinyl oxazolidone,
N-vinyl-2-pyrrolidone,
N-vinyl-5-methyl-2-pyrrolidone,
N-vinyl-5-ethyl-2-pyrrolidone,
N-vinyl-2-piperidone,
N-vinyl-6-methyl-2-piperidone,
N-vinyl-6-ethyl-2-piperidone,
N-vinyl-ε-caprolactam,
N-vinyl-7-methyl-ε-caprolactam and
N-vinyl-7-ethyl-ε-caprolactam.

Comparable monomers of the corresponding N-vinyl thiolactams can also be used as co-monomers. Other comonomers include N-acryloyl-pyrrolidone, -piperidone and -caprolactam; N - acryloyl - 5 - methylpyrrolidone, N-acryloyl - 6 - methylpiperidone and N - acryloyl - 7-methyl caprolactam and their corresponding 5-, 6- and 7 - ethyl derivatives; N - acryloxy - methyl - pyrrolidone, -piperidone and -caprolactam; N - methacryloxy - propyl pyrrolidone, piperidone and -caprolactam; N-methacryloxy - ethyl - pyrrolidone, -piperidone and -caprolactam; N - methacryloxy - methyl - 5 - methylpyrrolidone, -6-methylpiperidone and -7 - methyl - caprolactam; N - methacrylamidomethyl-, N - methacrylamidoethyl-, N - methacrylamidopropyl-, and N - (N - phenylacrylamidopropyl) pyrrolidones, -piperidones and -caprolactams; vinyl esters such as vinyl acetate, vinyl propionate, vinyl butyrate, vinyl isobutyrate, vinyl lactate, vinyl caproate, vinyl caprylate, vinyl oleate, and vinyl stearate; acrylonitrile; styrene; acrylic acid; acrylate ester monomers of the formula $$CH_2=CHCOOR_2$$

wherein $R_2$ represents either a straight or branched alkyl of from 1 to 18 carbon atoms or an alkoxyalkyl in which the total number of carbon atoms in the alkyl groups range from 3 to 6. As examples of such acrylate esters the following are illustrative: methyl, ethyl, propyl, isopropyl, butyl, isobutyl, s-butyl, 2-methyl-1-butyl, 3-methyl-1-butyl, 2-ethyl-1-butyl, amyl, 3-pentyl, 2-methyl-1-pentyl, 4-methyl-2-pentyl, hexyl, 2-ethylhexyl, heptyl, 2-heptyl, octyl, 2-octyl, nonyl, 5-ethyl-2-nonyl, decyl, 2-methyl-7-ethyl-4-undecyl, dodecyl, tetradecyl, hexadecyl, octadecyl, 2-methoxyethyl, 2-ethoxyethyl and 2-butoxyethyl acrylate; methacrylic monomers such as methacrylic acid, methyl methacrylate, cyclohexyl methacrylate, isobutyl methacrylate, isoamyl methacrylate, β-methoxy ethyl methacrylate and α-(o-chlorophenyl) ethyl methacrylate, β-phenoxy-ethyl methacrylate, α-phenylethyl methacrylate, phenyl methacrylate, o-cresyl methacrylate, p-cyclohexylphenyl methacrylate, 2-nitro-2-methyl propyl methacrylate, diethylaminoethyl methacrylate, ethylidene acetate methacrylate and glycidyl methacrylate, including esters of halo acrylic acids, such as methyl-α-chloro-acrylate, ethyl - α - chloro - acrylate, phenyl - α - chloroacrylate, α-ethylacrylic acid; methacrylonitrile; acrylamide; methacrylamide, as well as N-alkyl and N-aryl substituted acrylamides such as N-methyl acrylamide, N-ethyl acrylamide, N-propyl acrylamide, N-n-butyl acrylamide, N-n-dodecyl acrylamide, N-n-octadecyl acrylamide, N,N-dimethyl acrylamide, N,N-diethyl acrylamide, N,N-di-n-butyl acrylamide, N,N-di-isobutyl acrylamide, N-cyclohexyl acrylamide, N,N-dicyclohexyl acrylamide, N-phenyl acrylamide, N-p-nitro-phenyl acrylamide, N-α-naphthyl acrylamide, N-β-naphthyl acrylamide, N-methyl-N- phenyl acrylamide, N,N-di-phenyl acrylamide, N-benyl acrylamide, N,N-dibenzyl acrylamide; and grafted monomers of the type disclosed in United States Patents 3,029,219; 3,035,009; 3,036,033, and the like.

As noted above, the N-vinyl-3-alkyl lactams are readily copolymerized with any one of the foregoing comonomers in virtually any proportions to yield polymers having a wide range of soluble characteristics in both polar and non-polar solvents. However, where solubility in hydrocarbons, mineral oils, lubricating oils, etc., are desired, it is preferred that the comonomer mixture contain from 10 to 95 percent by weight of the N-vinyl-3-alkyl lactam and from 5 to 90 percent by weight of the other comonomer. Such copolymers have an average molecular weight ranging from 10,000 to 400,000. The average molecular weight of such copolymers, as well as the homopolymers of the N-vinyl-3-alkyl lactams, is readily determined by viscosity measurements. The viscosity coefficient, K, which is fully described in Modern Plastics, 23, No. 3, 157–61, 212, 214, 216 and 218 (1945) is calculated as follows:

$$\frac{\log \eta_{rel}}{c} = \frac{75 K_0^2}{1+1.5 K_0 c} + K_0$$

and $K = 1000 K_0$ where $c$ is the concentration in grams per 100 ml. of copolymer in solution and the $\eta_{rel}$ is the viscosity of the solution compared to solvent. Copolymers prepared with the aforestated proportions of comonomers have K values ranging from 10 to about 100.

The following examples will show how the N-vinyl-3-alkyl lactams are homopolymerized and copolymerized with other monomers.

EXAMPLE 16

Into a 500 ml. flask equipped with stirrer, condenser, thermometer and nitrogen gas inlet, there were charged 62.5 grams each of anhydrous ethanol S.D. 40 and N-vinyl-3-octyl-pyrrolidone of Example 11 under a nitrogen blanket and the mixture allowed to reach a temperature of 26° C. After five minutes, a catalyst mixture consisting of 0.313 grams of the azodiisobutyronitrile and 0.625 grams of 35% hydrogen peroxide was added and the mixture heated to reflux. Within approximately one hour at a pot temperature of 83.5° C., the reaction mixture was a clear solution with no apparent exotherm. The mixture was permitted to reflux for four hours at a pot temperature of 80° C. during which time a slightly viscous, clear solution was obtained. The mixture was cooled to 27° C. and charged with 25% by weight of the initial catalyst mixture and the heating to reflux resumed at a pot temperature of about 80° for an additional nine hours. The reaction mixture was cooled to room temperature and a small sample taken for determination of the percent of unreacted N-vinyl-3-octyl-pyrrolidone, which was about 0.51%. The reaction mixture was discharged into a polyethylene lined tray and dried in a vacuum at 40°–50° C. The resulting dry homopolymer is yellow in color and resembles a hard rubbery solid. The K value in benezene was 17.7.

EXAMPLE 17

Example 16 was repeated with the exception that 62.5 grams of N-vinyl-3-octyl-pyrrolidone were replaced by 62.5 grams of N-vinyl-3-hexyl pyrrolidone of Example 12 and no hydrogen peroxide used. The dried product was a light yellow solid in color and was a rather brittle solid. The K value in benzene was 34.

EXAMPLE 18

Example 16 was again repeated with the exception that the N-vinyl-3-octyl-pyrrolidone was replaced by 70 grams N-vinyl-3-dodecyl piperidone of Example 13 and no peroxide was used. The dried product was off-white in color and resembled a hard waxy solid. The K value in benzene was 35.

EXAMPLE 19

Example 16 was again repeated with the exception that the N-vinyl-3-octyl-pyrrolidone of Example 11 was replaced by 65 grams of N-vinyl-3-decyl caprolactam of Example 14 and no peroxide was used. The dried product was off-white in color and resembled a hard waxy solid. The K value in benzene was 30.

EXAMPLE 20

Example 16 was again repeated with the exception that the N-vinyl-3-octyl-pyrrolidone was replaced by 68 grams of N-vinyl-3-hexadecyl-pyrrolidone of Example 15 and no peroxide was used, and isopropanol was used as solvent instead of ethanol. The dried product was a white waxy solid. The K value in benzene was 36.

EXAMPLE 21

Into a one-half liter, four-necked flask equipped with stirrer, thermometer, nitrogen inlet and reflux condenser, the following ingredients were charged and the system purged with nitrogen:

N-vinyl-3-octyl pyrrolidone—133.8 grams (0.6 mole).
Vinyl acetate—34.4 grams (0.4 mole).
Isopropanol—150 grams.
Azodiisobutyronitrile—0.35 grams.

The contents of the charged and purged flask were maintained at reflux for 6 hours. Thereafter 0.35 gram of azo catalyst were added and refluxing continued for another 6 hours. In the analysis of the contents of the flask, the unreacted vinyl acetate monomer was found to be below 1% of the total monomer charged. The isopropanol was stripped in vacuum. The resulting copolymer was an off-white waxy substance, insoluble in water, but soluble in aliphatic and aromatic hydrocarbons, fatty acids, etc. The K value in benzene was 35.

EXAMPLE 22

Into the apparatus of Example 21, the following ingredients were charged and the system purged with nitrogen:

N-vinyl-3-hexyl pyrrolidone—137 grams (0.7 mole).
Vinyl propionate—30 grams (0.3 mole).
n-Butanol—150 grams.
Azodiisobutyronitrile—0.4 gram.

The contents of the charged and purged flask were maintained at reflux for 6 hours. Thereafter, 0.4 gram of azo catalyst was added and refluxing continued for another 6 hours. The analysis of the contents of the flask showed less than 1% of unreacted vinyl propionate based on the total monomer charged. The isopropanol was stripped in vacuum. The resulting copolymer was an off-white waxy substance insoluble in water, but soluble in hexane, benzene, mineral oil and kerosene. The K value in benzene was 38.

EXAMPLE 23

Into the apparatus of Example 21, with the exception that a 1 liter flask was employed, the following ingredients were charged and the system purged with nitrogen:

N-vinyl-3-dodecyl piperidone—29.3 grams (0.1 mole).
Vinyl laurate—204 grams (0.9 mole).
Hexanol—170 grams.
Azodiisobutyronitrile—0.5 gram.

The contents of the charged and purged flask were maintained at reflux for 7 hours. Thereafter 0.5 gram of azo was added and refluxing continued for another 7 hours. Analysis for monomer showed less than 1% of unreacted vinyl laurate based on the total monomer charged. The hexanol was stripped in vacuum. The resulting copolymer was an off-white waxy substance insoluble in water, but soluble in hexanol, hexane, mineral oil, benzene, and in aliphatic and aromatic solvents. The K value in benzene was 25.

EXAMPLE 24

Into the apparatus of Example 21, with the exception that a 1 liter flask was used, the following ingredients were charged and the system purged with nitrogen:

N-vinyl-3-decyl caprolactam—251 grams (0.9 mole).
Vinyl acetate—8.6 grams (0.1 mole).
Methyl ethyl ketone—160 grams.
Azodiisobutyronitrile—0.6 gram.

The contents of the charged and purged flask were maintained at reflux for 8 hours. Thereafter 0.6 gram of azo catalyst was added and refluxing continued for another 8 hours. Analysis for monomer showed less than 1% of unreacted vinyl acetate based on the total monomer charged. The methyl etheyl ketone was stripped in vacuum. The resulting copolymer was an off-white waxy substance insoluble in water, but soluble in hexanol, octane, pharmaceutical grade mineral oil, and aliphatic and aromatic solvents. The K value in benzene was 37.

EXAMPLE 25

Into the apparatus of Example 21, with the exception that a 1 liter flask was used, the following ingredients were charged and the system purged with nitrogen:

N-vinyl-3-hexadecyl pyrrolidone—67 grams (0.2 mole).
Vinyl stearate—248 grams (0.8 mole).

Hexanol—200 grams.
Azodiisobutyronitrile—2 grams.

The contents of the charged and purged flask were maintained at reflux for 8 hours. Thereafter 2 grams of azo catalyst were added and refluxing continued for another 8 hours. Analysis for monomer showed less than 1% of unreacted vinyl stearate. The hexanol was stripped in vacuum. The resulting copolymer was a light-gray waxy substance insoluble in water, ethanol, but soluble in hexanol, hexane, mineral oil, lubricating oil, benzene and a variety of aliphatic and aromatic hydrocarbons. The K value in benzene was 40.

The homopolymers and copolymers of the N-vinyl-3-alkyl lactams prepared in the aforestated preferred ratios of monomers display emollient properties, i.e., softening and soothing effect when applied to the skin and the appendages of the skin. In view of this characteristic, they are excellent additives to soaps and cosmetic preparations of the cleansing, conditioning and embellishing type which will impart a smooth texture as well as a softening and soothing effect to the skin and skin appendages. The homopolymers and copolymers can be used in place of, and in addition to, petroleum hydrocarbons, i.e., mineral oils, petrolatums and paraffin waxes. They are not only soluble in these petroleum hydrocarbons, but also soluble in other unctuous materials such as fatty acids; stearic, myristic oleic acids, etc.; glyceryl monostearate (Glycosterin); lanolin (wool fat); beeswax and other animal and vegetable waxes; higher alcohols, such as hexanol, myristyl alcohol, etc.; polyoxyalkylene glycols, e.g., polyoxyethylene glycol, polyoxypropylene glycol; methyl ethyl ketone, Cellosolve, butyrolactone, etc., which are employed in toiletry preparations of this type. They are readily emulsified by the usual reagents employed in toiletry manufacture. By virtue of this solubility, emulsifiability and broad compatibility with other components of the toiletry preparation, they substantially reduce or eliminate the drying tendency of mineral oils and petrolatums present in such preparations. The presence of the additive (alkylated polymer) in toiletry preparations containing paraffin wax eliminates the clogging of pores. Regardless whether the toiletry preparation contains any one or all of these petroleum hydrocarbons, vegetable oils, lanolin, and/or other unctuous components, or is free from such components, etc., the presence of the additive in such preparation imparts a much smoother texture to it with the attendant softening and soothing effect when applied to the skin and a softening effect when applied to skin appendages.

The amount of alkylated polymer that is employed to effect the desired results (smoother texture with softening and soothing effects) ranges from about 0.1% to about 50% by weight based on the total weight of the completed toiletry preparation. The alkylated polymers are added at any stage of manufacture of cold creams, cleansing creams, emollient creams, finishing creams, skin-softening lotions, and cleaners, lubricating creams, overnight creams, absorption-base creams, hand creams and lotions, foot creams, baby creams, baby skin oils; special creams, such as astringent creams, bleaching creams, acne creams; protective creams (industrial creams), vanishing creams, foundation creams, brushless shaving creams, shaving preparations, after-shave lotions and sprays, medicated creams, deodorants and anti-perspirants, such as deodorant creams and lotions, roll-on deodorants, sunburn preventives, sun-tan preparations, paste or lotion rouges, cream rouges, massage oils, facial masks, depilatories, i.e., hair removers (epilating wax compositions) and hair removing creams, paste or lotion face makeup, face powders; eye makeup, i.e., eye shadows and eyebrow creams; fingernail creams and cleaners, hair bleaches and tints, cuticle softeners, hair conditioners, wave sets, hair dressings, hair brilliantines; hair oils, hair sprays, creams and shampoos, nail polish removers, lipsticks, perfume sticks, facial soaps, synthetic soap bars, antiseptic soaps (tincture of green soap), insect repellents, protective hand creams, waterless hand cleaners, dentifrice, pet shampoos, bath talcs, and the like.

Toiletry preparations containing the alkylated polymer render the preparation smoother in texture and easier in application to the skin and its appendages (hair and nails). After application to the skin or scalp, the preparations leave the skin soft and pliable with a soothing effect which remains after the preparation is removed by washing with soap and water. After application to the hair, the preparation deposits a film which renders the hair soft, smooth, lustrous and alive-looking. The soft and smooth effects remain after washing with soap and water and enhance the manageability of the hair. After application of the nail preparations, the nails are smooth and the adjacent skin rendered soft and pliable with a soothing effect.

The alkylated polymers are effective pigment dispersers and act as color receptors. In hair preparations and presence of the alkylated polymer improves the softness, water repellency and manageability of the hair. In hair conditioners, the alkylated polymers may be added to creams, foams or gels and the resulting preparations pressurized with nitrogen, argon, or the usual liquefied fluoro-chloro-hydrocarbons.

In view of their solubility in hydrocarbons, mineral oils, etc., the alkylated polymers are particularly adaptable for use as hot melts alone or in combination with paraffin waxes as coatings for various fibrous materials. Extruded films from such alkylated polymers, either alone or with waxes and resins, may be composited to paper and other fibrous materials. The alkylated polymers are compatible with a wide variety of resins, waxes, and polymers at room or elevated temperatures. They are useful as binders and saturants in hard board and particle board.

Polymers in which 60% to 100% of the lactam units contain an alkyl group of from 8 to 42 carbon atoms, are useful for the protection of wires and cables in the form of outer jackets and sheets. Films or coatings of such alkylated polymers are also useful as liners for metal or fiber drums for shipping moist, dusty or corrosive products. They are also useful in electrical equipment such as in electric cable insulation, in potting dopes for capacitor elements, and as insulating coatings, sealing compounds, and in moisture-proofing coils, resistors and paper capacitors; as caulking compounds, spreader-sticker for insecticidal compositions, water-proofing sealants, adhesives, water-proofing, sound-proofing gum and resin plasticization, paper coatings, metal rolling and as dispersants for inks and dye pastes. They are useful in leather treatment, as dye assistants, textile water-proofing, textile warp size, and the like.

Emulsions of the alkylated polymers are especially useful in the impregnation of paper. When mixed in amounts ranging from about 1 to 3% by weight in light mineral oils, the alkylated polymers function effectively as penetrants in the removal of rusty and frozen nuts and bolts.

The alkylated polymers are especially adaptable in dye stripping, as pigment dispersants and protective colloids, temporary protective coatings, paper additives and coatings, binders for detergent briquettes and as binders for tablets and as color dispersants in tablet coating. Films of the alkylated polymers, from aqueous dispersion or emulsion, are effective for spraying various plants so as to protect them during transplanting or prevent rapid transpiration during winter months.

The alkylated polymers are useful in dispersing gums, resins and various types of polymers. They are particularly adaptable in lubricating oils as sludge dispersers, and as bonding agents for paper, plastics and textile fabrics. They are very useful as anti-redeposition agents in detergents, as detergent hydrotropes and pacifiers, in dry cleaning detergents, foam stabilizers for shampoos, stabilizers for drilling of oil or gas wells, latex stabilizers, hydraulic fluid emulsion stabilizers, emulsifiers in emulsion polymerization reactions, inhibitors for clay hydration, slushing oil corrosion inhibitors, engine oil rust inhibitors, textile fiber lubricants, complexing agents for liquid-liquid extracts, dye receptors for polypropylene, dye fixing agents, pigment dispersants in pigment printing, fluidizing agents for paper coating slurries, pitch dispersants; adhesives in place of starch, casein, synthetic latices and the like; anti-static agents for polystyrene and other plastics, tackifiers for polyolefins and other plastics, flexibilizing agents for phenolic and other thermo-setting resins, dispersants and gloss improvers in floor wax polishes, thickening agents in non-aqueous systems, as membranes for dye-setting and filtration, as adhesion promotors for paperboard to nylon and as dye receptors for Creslan. They are also useful as additives to waxes to lower melt viscosity, improve flexibility, gloss, or hardness. They are useful as ink acceptors for surface printing of high density polyethylene bottles, absorbents for tobacco tars in cigarette filters, absorbents for toxic gases and vapors, complexing agents for heavy metal ions, thickeners for petroleum oils and oil based paints; flocculating agents in sewage treatments, as coating for adhesive tapes and as components in adhesive hot melts, melting point dispersants for natural and synthetic resins and as reinforcing agents for glue reducers of the hydrophilic character of polar resins.

The alkylated polymers are excellent dye receptors for polyolefin fibers such as polyethylene, polypropylene and polybutene. They add strength and good dyeing properties when employed with rayon, both Viscose and Acetate. They are excellent sizers for glass fibers since they have the adhesion due to the N-vinyl lactam units but better lubricity because of the alkyl units. The alkylated polymers improve the gloss of waxes and polishes. They are better soil suspending agents than the corresponding unalkylated polymers in synthetic detergents. They are especially useful in the de-emulsification of crude oil emulsions. They are useful as soil dispersing agents for dry cleaning media. They are useful as anti-static agents for synthetic fibers. In the textile industry, they are useful in the preparation of fibers, anti-static agents, lubricants, waxes and dye assistants for dye leveling agents. They are also useful as tackifiers, pacificers, flocculators, and gelling agents.

The alkylated polymers display dispersing and detergent properties when incorporated into petroleum products such as kerosene, fuel oils, jet fuels and other combusible hydrocarbon liquids. They readily disperse gums, resins (asphaltenes) in such products.

The alkylated polymers are also useful as mold release lubricants, as anti-tack and anti-block agents, as anti-static agents for films and textile fibers, and as flattening, softening and sizing agents for textiles. They are compatible with petroleum resins and the mixture employed in water-proofing, pipe coating compounds, and as concrete curing compounds to insure the deposition of a water-proof membrane. In carbon paper, the alkylated polymers serve as a vehicle for carrying the color and prevent the ink from soaking completely into the paper. Polyethylene containing sodium bicarbonate and the polymers in which the lactam units contain alkyl groups of from 6 to 10 carbon atoms can be extruded coaxially with a core to give a foam-sheathed cable.

The alkylated polymers form halogen adducts with elemental iodine, iodine monochloride and iodine monobromide. The iodine adducts are prepared by gently heating the alkylated polymer until it melts and with constant stirring adding elemental iodine or a solution of elemental iodine in alcohol or carbon tetrachloride or a mixture thereof. From 2 to 12% of iodine by weight of polymer may be incorporated to the molten polymer. The resulting iodine adduct is soluble in a pharmaceutical grade mineral oil and other unctuous materials. The iodine adduct may be incorporated in powders, ointments, salves, suppositories, and toiletry preparations (cosmetics and soaps) to yield antiseptic and germicidal compositions which impart a soft, smooth and softening effect to the skin.

The alkylated polymers are excellent V.I. improvers in lubricating oils. They are useful additives to automobile polishes to increase gloss and as rust inhibitors in priming and finishing paints for metals. The alkylated polymers are readily chlorinated by conventional procedures to yield a new and useful class of polymers having fire-retarding properties.

The polymeric N-vinyl-3-alkyl lactams, in which the 3- or α-position to the carbonyl in each lactam moiety of the polymer is 100% substituted by an alkyl group of from 6 to 42 carbon atoms, as provided by the present invention, differ from the alkylated polymeric N-vinyl lactams obtained by the process disclosed in the application of A. Merijan, F. Grosser and E. V. Hort, Ser. No. 508,547 filed on November 18, 1965, now U.S. Patent 3,417,054, in that at least 2.8% of lactam moieties of the latter polymers are randomly alkylated in one or more of the carbon atoms alpha and omega to the carbonyl and alpha-vinyl carbon atoms of the lactam moiety. In other words, from at least 2.5% to as high as 100% of the lactam moieties of the polymers prepared in accordance with the procedure of said application contain an alkyl substituent of at least 2 carbon atoms on one or more of the carbon atoms alpha and omega to the carbonyl and alpha-vinyl carbon atom of the lactam moiety in said polymers.

We claim:
1. The copolymer of the addition copolymerization of 0.1 to 0.9 mole of vinyl ester monomer and from 0.9 to 0.1 mole of vinyl monomer having the formula:

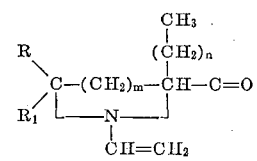

wherein R and $R_1$ are selected from the group consisting of hydrogen, methyl and ethyl, $m$ is a positive integer of from 1 to 3 and $n$ is a positive integer of from 5 to 41 having a K value in benzene in the range of from about 25 to 40.

2. The copolymer of the addition copolymerization of 0.4 mole of vinyl acetate and 0.6 mole of vinyl monomer having the formula:

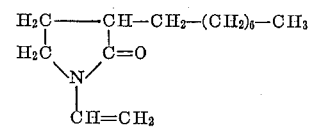

having a K value in benzene in the range of from about 25 to 40.

3. The copolymer of the addition copolymerization of 0.3 mole of vinyl propionate and 0.7 mole of vinyl monomer having the formula:

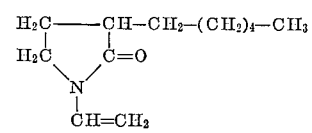

having a K value in benzene in the range of from about 25 to 40.

4. The copolymer of the addition copolymerization of 0.9 mole of vinyl laurate and 0.1 mole of vinyl monomer having the formula:

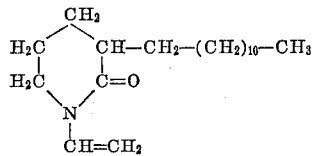

having a K value in benzene in the range of from about 25 to 40.

5. The copolymer of the addition copolymerization of 0.1 mole of vinyl acetate and 0.9 mole of vinyl monomer having the formula:

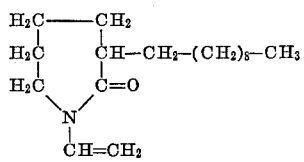

having a K value in benzene in the range of from about 25 to 40.

6. The copolymer of the addition copolymerization of 0.8 mole of vinyl stearate and 0.2 mole of vinyl monomer having the formula:

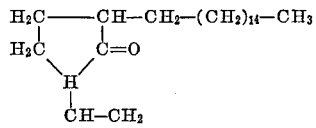

having a K value in benzene in the range of from about 25 to 40.

References Cited

UNITED STATES PATENTS

| | | | |
|---|---|---|---|
| 2,497,705 | 2/1950 | Werntz | 260—85.7 |
| 3,137,679 | 6/1964 | Agius et al. | 260—78.5 |
| 3,332,938 | 7/1967 | Mayhew et al. | 260—239.3 |

JOSEPH L. SCHOFER, Primary Examiner

S. M. LEVIN, Assistant Examiner

U.S. Cl. X.R.

117—124, 127, 128.4, 138.8, 139.5, 122, 142, 155; 252—50, 515; 260—23, 28.5, 32.8, 33.2, 33.4, 33.6, 80.3, 85.5, 86.1, 88.1, 88.3, 93.5, 93.7, 94.9, 239.3, 224, 47, 875, 882, 885, 874; 424—59, 65, 70, 73, 78